United States Patent [19]

Romankiw

[11] 3,908,194

[45] Sept. 23, 1975

[54] INTEGRATED MAGNETORESISTIVE READ, INDUCTIVE WRITE, BATCH FABRICATED MAGNETIC HEAD

[75] Inventor: Lubomyr T. Romankiw, Briarcliff Manor, N.Y.

[73] Assignee: International Business Machines Corporation, Armonk, N.Y.

[22] Filed: Aug. 19, 1974

[21] Appl. No.: 498,504

[52] U.S. Cl. .................. 360/113; 29/603; 360/122; 360/125

[51] Int. Cl.[2] ........................ G11B 5/30; G11B 5/42

[58] Field of Search .................... 360/113, 121-123, 360/125-126; 29/603; 324/46; 338/32 R, 324

[56] References Cited

UNITED STATES PATENTS

| | | | |
|---|---|---|---|
| 3,723,665 | 3/1973 | Lazzari | 360/123 |
| 3,787,964 | 1/1974 | Simon et al. | 360/123 |
| 3,813,692 | 5/1974 | Brock et al. | 360/113 |
| 3,814,863 | 6/1974 | O'Day et al. | 360/113 |
| 3,840,898 | 10/1974 | Bajorek et al. | 360/113 |
| 3,846,841 | 11/1974 | Lazzari et al. | 360/121 |
| B371,787 | 1/1975 | Thompson | 360/122 |

*Primary Examiner*—Alfred H. Eddleman
*Attorney, Agent, or Firm*—Graham S. Jones, II

[57] ABSTRACT

A thin film head includes a permeable substrate providing a first shield, which may include a more highly permeable layer on its upper surface for shielding, a layer of permeable material thereon providing a second shield and a first write head leg referred to as the shielding-leg layer and a magnetic gap filled with dielectric material between the substrate and the shielding-leg layer. A magnetoresistive stripe including permeable material extends within the dielectric in said gap near the tip end of the head spaced from the substrate and the shielding-leg layer. An inductive single turn or multiturn writing winding is formed upon a layer of dielectric on the other side of the shielding-leg layer. A second leg layer covers the half of the spiral winding towards the tip end of the head and extends through an opening into contact with the shielding-leg layer.

20 Claims, 10 Drawing Figures

INTEGRATED MAGNETORESISTIVE READ, INDUCTIVE WRITE, BATCH FABRICATED MAGNETIC HEAD

BACKGROUND OF THE INVENTION

1. Field of the Invention

This invention relates to magnetic heads for writing and reading on magnetic recording media.

2. Description of the Prior Art

Heretofore, it has been proposed to provide combined magnetic recording head structures with both the read and write heads in the same integrated thin film structure.

In a publication by G. B. Brock, F. B. Shelledy, and L. Viele entitled "Magnetoresistive Read/Write Head," IBM Technical Disclosure Bulletin Vol. 15, No. 4, September 1972, pp. 1206–1207, a pair of ferrite slabs in parallel define a magnetic gap. Close to the tip of the slabs adjacent to where the magnetic media will lie is placed a magnetoresistive (MR) reading element. Within the same gap is located another element which is a write conductor, spaced farther back than the MR element. A problem with that arrangement is that because of the geometry and spatial considerations, the thick ferrite slabs and the inductive write head produce a wide gap and therefore a broad writing area (low linear writing density) rather than a narrowly defined area (high linear writing density). This results in a head providing a low linear density of recorded data.

The fields created between the pole tip ends of the inductive write head during writing produce strong enough magnetic fields near the tip of the head in the area where the MR stripe is located so that when a hard bias scheme is used, it tends to demagnetize the permanent or hard bias in a hard biased MR stripe. Furthermore, reading with a head in which the hard bias film has been demagnetized is impossible.

In another publication by E. P. Valstyn entitled "Composite Read/Write Recording Head," IBM Technical Disclosure Bulletin, Vol. 14, No. 4, September 1971, pp. 1283–1289, an inductive read-inductive write head is provided. In this case, the read head reads a very wide track with flux fringing from the write conductor through all three legs of the head, 10, 14, and 17. Such fringing causes the reading to be blurred. Thus, lack of clarity of data read occurs because of overlapping of flux from previous and subsequent records. The closure at the back causes coupling of all three legs of the head which leads to the problem of overlapping.

United States application Ser. No. 424,242 of Nepala et al. for a "Head Assembly for Recording and Reading Employing Inductive and Magnetoresistive Elements" shows conductor films surrounding an MR element in conjunction with a current supply that can vary the direction and magnitude of the current provided to the conductors. Again, the MR element being positioned inside the writing head gap is exposed to such fields from the inductive elements during writing that a hard bias MR element would tend upon first use of the writing head to be demagnetized by the strong fields.

It is an object of this invention to provide a read-write head where the read and write elements are magnetically separated and where there is excellent definition of the magnetic signals seen by the read element.

Another object of this invention is to provide an integrated thin film read-write head having a very narrow read head gap and separate magnetic circuits for the two heads whereby the read head is protected from cross-talk caused by magnetic fields from the write-head magnetic circuit and wherein the thin film structure is simple, easily fabricated and is as thin and compact as possible.

Still another object is to provide an extremely efficient shielding means for the reading head and a highly permeable write head yoke which at the same time serves as a second extremely efficient shield for the MR read head.

Another object is a head which permits reading the material just written in a single package when the write head precedes the read head.

Yet another object of the invention is to build an integrated MR and inductive head which permits writing with a wide recording track while reading with a narrow track of sensed data, thus avoiding track fringing interference.

SUMMARY OF THE INVENTION

A magnetic recording head reads and writes onto a magnetic recording medium. It includes a first magnetic shield of permeable material having substantially planar surface and a first tip end. A first, thin film layer of dielectric material is in secure contact with said planar surface of said shield. A thin film magnetoresistive stripe form of magnetic writing head structure is in secure contact with the first layer of dielectric material aligned longitudinally adjacent to the tip end at the end of the head adapted to face the recording medium. A second thin film layer of dielectric material lies in secure contact with the first layer of dielectric and the magnetoresistive structure. The thin film conductor is connected to terminals of the magnetoresistive stripe. A thin film shielding-leg layer of a magnetically permeable material providing a second shield and a first write leg in secure contact with the second layer of dielectric material extends alongside the magnetoresistive stripe substantially parallel to the planar surface of the first shield having a second tip end adjacent to the first tip end to define a magnetic gap. A third thin film layer of dielectric material lies in secure contact with the shielding-leg layer. A thin film electrical winding is in secure contact with the third thin film layer passing near the second tip end. A fourth thin film dielectric layer lies in secure contact with the windings and the third dielectric layer has a slot through it extending through the center of the winding located centrally thereof and through the third dielectric layer to the second shield. A second leg layer has a third tip end aligned with the first and second tip ends and extends through the slot into magnetic contact with the shielding leg layer so the windings extend between the shielding-leg layer and the second leg layer for providing magnetic writing fields across the gap between the tip ends of the leg layers.

Preferably, the magnetoresistive stripe is composed of a sandwich of a sufficiently magnetically hard bias material which cannot be demagnetized by the usual fields emanating from the medium and a magnetoresistive sensor separated by a high resistivity layer.

In accordance with the method of this invention, a magnetoresistive read, inductive write head is fabricated. First a dielectric layer is deposited upon a shielding substrate. Then magnetoresistive material is deposited upon the substrate to form an MR stripe. Next conductors are deposited through a mask. In the next step a dielectric layer is added. Next, a central permeable layer is applied. Then a third dielectric layer is applied. Subsequently, read head windings are made thereon. In the next step, another dielectric layer is applied. Then openings are made to the conductors, terminals of the windings and the central layer, and then a top layer of permeable material is deposited through the openings to provide both pads and a top leg layer for the read head through use of masking techniques.

Preferably, the shielding substrate is either a ferrite slab or a ferrite slab with a thin highly permeable film on top of it.

DESCRIPTION OF THE PREFERRED EMBODIMENT

Figure 1:
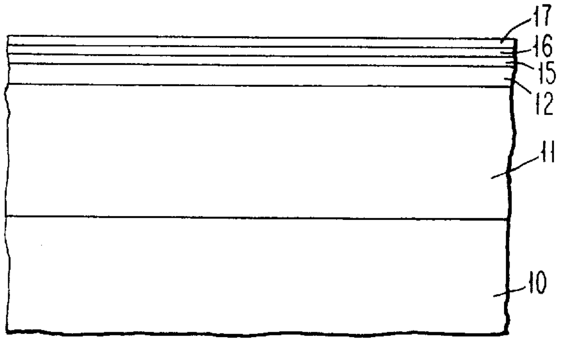
FIG. 1 shows a tip end view of a magnetic recording head substrate including the permeable base and a magnetoresistive sandwich layer separated by dielectric.

The head shown in FIGS. 1–8 comprises a magnetoresistive sensor and an inductive writing element combined upon a single magnetically shielding substrate 10 composed of a ferrite material with a further shielding layer 11 of permalloy thereon or a silicon wafer 10 with a highly permeable laminated permalloy layer 11 thereon. The ferrite substrate is preferably about 50 mils thick and if desired can be composed of a single crystal. The layer 11 has a composition such as 80% nickel, 20% iron or the equivalent high permeability materials such as supermalloy (4% Cu, 4% Mo, 16% Fe, and 76% Ni). The thin film permalloy layer should be 10,000A to 30,000A thick, providing a permeance at a frequency of 100 Mhz at least 3K micro-meters. Provision of a permalloy layer or the equivalent has the advantage of providing a double shield for the magnetoresistive stripe employed in the head, which is more efficient than a single shield.

Upon the substrate 10 and permalloy, if any, is deposited a dielectric layer 12 from 2,000A – 5,000A thick composed of $Al_2O_3$, $SiO_2$, $Si_3N_4$, SiO or any other equivalent nonmagnetic mechanically hard dielectric which are selected as exemplary materials because they are mechanically hard, wear resistant, easily deposited, and readily etched. In general, the same dielectric should be used throughout the head.

Next, an MR (magnetoresistor) sandwich 14 preferably 1,000A thick of three layers is deposited all over the dielectric layer 12. The MR sandwich, preferably 550 to 2,000A thick, includes the bias layer 15 about 100 – 1,000A thick which can be hard biased: $Fe_3O_4$ (NiCo, CoPt), exchange coupled $Fe_2O_3$ and Fe or soft biased: about 170A permalloy preferably. The magnetic moment thickness product of layer 15 for optimum performance in the linear region and highest sensitivity should be approximately equal to 0.7 of the product of the magnetic moment times thickness of the MR film $(M_{s\text{-}hard} \times t_{hard})\ 0.7 = M_{s\text{-}MR} \times t_{MR}$. In any case, the next layer of the sandwich is a separator layer 16 of 200 – 1,000A preferably of Schott glass or any other high electrical resistivity material which is nonmagnetic and resistant to wear. The magnetoresistive layer 17 on top about 100 – 600A thick is preferably composed of 200A of permalloy.

Figure 2:
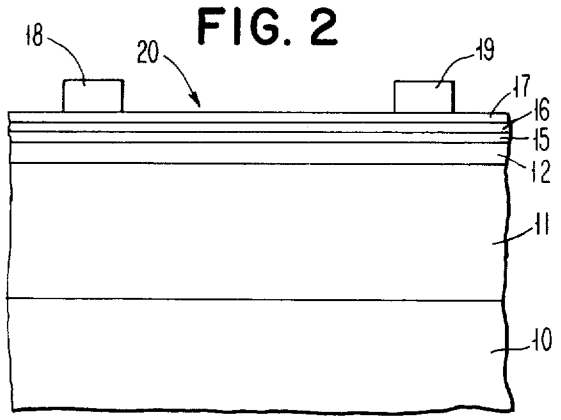
FIG. 2 shows a similar view of the device of FIG. 1 with conductors added.

Then, in the next step, shown in FIG. 2, conductors 18 and 19 of copper, gold or aluminum, etc. are applied onto the MR film by electroplating copper or gold as described below through the mask. Otherwise they are applied by evaporating gold or aluminum through a resist mask. When using gold or aluminum, the evaporation is preceded by evaporation of 50 to 100A flash of titanium as an adhesion layer. In general, the adhesion layer can also be any highly oxidizable valve type metal such as Mo, W, Al, Ta, Hf, V, Mn, and preferably Ti or Cr. They are applied onto MR sandwich layer 14 extending from the tip end 21 at the front edge towards the back of the head. When gold or copper is used, it is preferred to recess the conductors slightly to avoid corrosion. The conductors can also be applied by evaporation. The conductors are shaped using resist and a mask using photographic masking techniques in connection with an additive or a subtractive process. Preferably, the conductors 18 and 19 are composed of gold or copper and about 1,000A thick.

Figure 3:
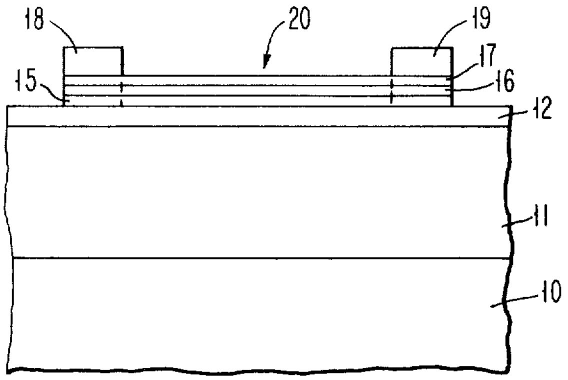
FIG. 3 shows a similar view of the device of FIG. 2 with surplus magnetoresistive sandwich material removed.

After conductors 18 and 19 are applied to the structure, the ends 28, 29 thereof to the left of tip end 21 (see FIG. 6) are raised by plating 4,000 – 10,000A and a mask is employed to provide an etchant protecting layer which will protect conductors 18 and 19 and a thin stripe 20 of the magnetoresistive layer 14 at the tip end 21 of the head to form a magnetoresistive head. In addition, or course, portions of the MR layer 14 beneath conductors 18 and 19 are protected also, although they are not essential to the invention, and could be omitted with extra processing steps. Then, as shown in FIG. 3, the unprotected MR layer 14 is etched away preferably using a sputter etching or ion milling technique (although chemical etching can be employed also.

Figure 4:
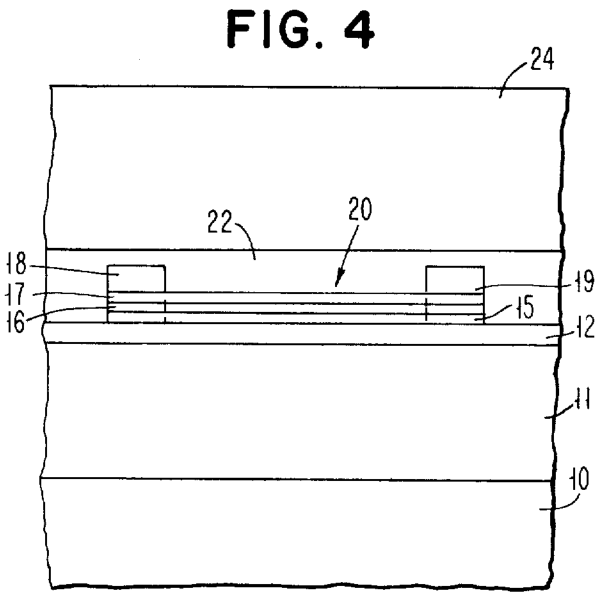
FIG. 4 shows a similar view of the device of FIG. 3 with a layer of dielectric added and a permeable shielding layer deposited thereon.

In the next step, an additional dielectric layer 22 (FIG. 4) of $SiO_2$, $Al_2O_3$, $Si_3N_4$, or SiO, etc. is applied with a thickness on the order of 3,000A – 9,000A sufficient to cover the top of conductors 18 and 19 and selected so that the magnetoresistive layer 17 will be half way between the upper surface of permeable substrate 10 or edge of layer 11, if present, and the top of dielectric layer 22 upon which permeable shielding-leg layer 24 providing a second shield of the MR stripe 20 and the first leg of inductive write head is next deposited as shown by FIG. 4. Thus, the magnetoresistive layer 17 is centered between the two shielding materials 10 (or permalloy 11) and 24, whose magnetic gap in between controls the portion of any juxtaposed magnetic media whose field can reach magnetoresistor 17 on stripe 20.

Shielding-leg layer 24 like shield 10 and shield 11 is provided to shield the MR stripe 20 from adjacent data outside the field to be read and to provide at the same time a writing head yoke for an inductive write head supported thereon. Layer 24 is preferably composed of permalloy or permalloy laminated with thin layers of nonmagnetic, high resistivity, high wear resistance material such as SiO or Schott glass. Any other highly permeable magnetic material such as an alloy of permalloy or ferrite is satisfactory if depositable and of high permeance (2–3k micro-meters). Plating through frame masks as shown in my copending application Ser. No. 426,862, filed Dec. 20, 1973, now U.S. Pat. No. 3,860,997, is the preferred way of applying the permalloy layer because it protects the underlayer from heating in a magnetic field during sputtering or evaporation which could tend to demagnetize the MR stripe 20, magnetically anneal it or destroy the magnetic anisotropy due to grain growth. Further, the plated material is easier to deposit and to obtain good definition subsequently, while chemically etching. The layer 24 is 1–4$\mu$ meters thick.

To electroplate permalloy film of copper or gold windings on an inorganic or organic dielectric and obtain good adhesion ($SiO_2$ or $Al_2O_3$ or polymer; polyimid, Shipley resist, etc.) perform one of the sets of steps as follows:

1. If it is desirable not to exceed a temperature of about 80°C, evaporate about 50 to 100A of titanium at any temperature from 0° to 80°C immediately followed by 500 to 1,000A of permalloy (in a magnetic field of about 20–40 oersteds) when preparing to plate a permalloy layer. Follow titanium with 200 to 500A of copper or gold when expecting to plate copper or gold windings, respectively. Titanium can be substituted by chromium and permalloy by copper or other similar platable metal.

2. If an elevated temperature will not be too harmful, evaporate about 500 to 1,000A of permalloy in a 20 to 40 oersted field applied parallel to the track width of the head at $>$ 100°C and preferably at about 200°C to 250°C. Permalloy can be substituted with Ni.

Both of the above sets of steps are metallizations provided prior to deposition of shields. For subsequent deposition of conductor coils, it is preferable to use step 1 above with Ti-Cu or Cr-Cu or Ti-Au or Ta-Au or Cr-Au, depending on whether the coils are plated using Cu or Au. Al-Cu or Al-Au may be preferred when the underlying dielectric is $Al_2O_3$.

The next step is to etch the shield 24 away beyond the back end line 25 of shield 24 in order to leave the ends 28 and 29 of conductors 18 and 19 accessible simply by etching away dielectric 22 thereabove when desired.

Figure 5:
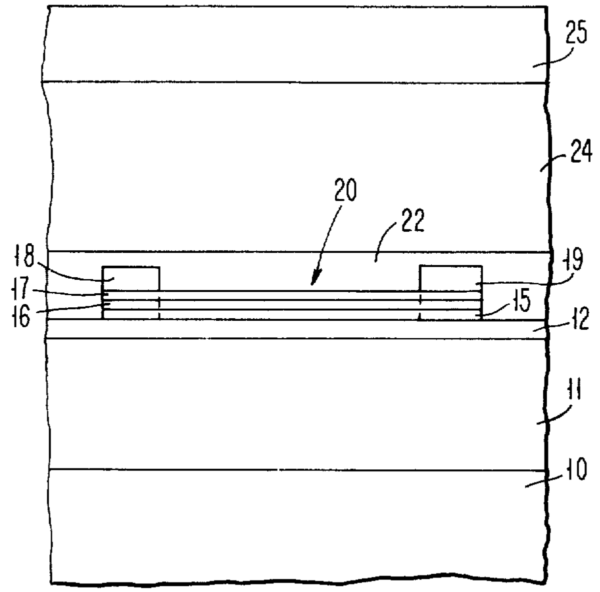
FIG. 5 shows a similar view of the device of FIG. 4 with a layer of dielectric deposited thereon.

Next, as in FIG. 5, a layer 25 of dielectric which is preferably 10,000A to 15,000A thick is applied by sputtering to cover the entire surface of the head, composed of one of the same range of materials as previous dielectrics. Then there is a step of masking and etching away dielectric 25 above the ends at conductors 28, 29 and to open slot 40 as shown in FIG. 6.

Figure 6:
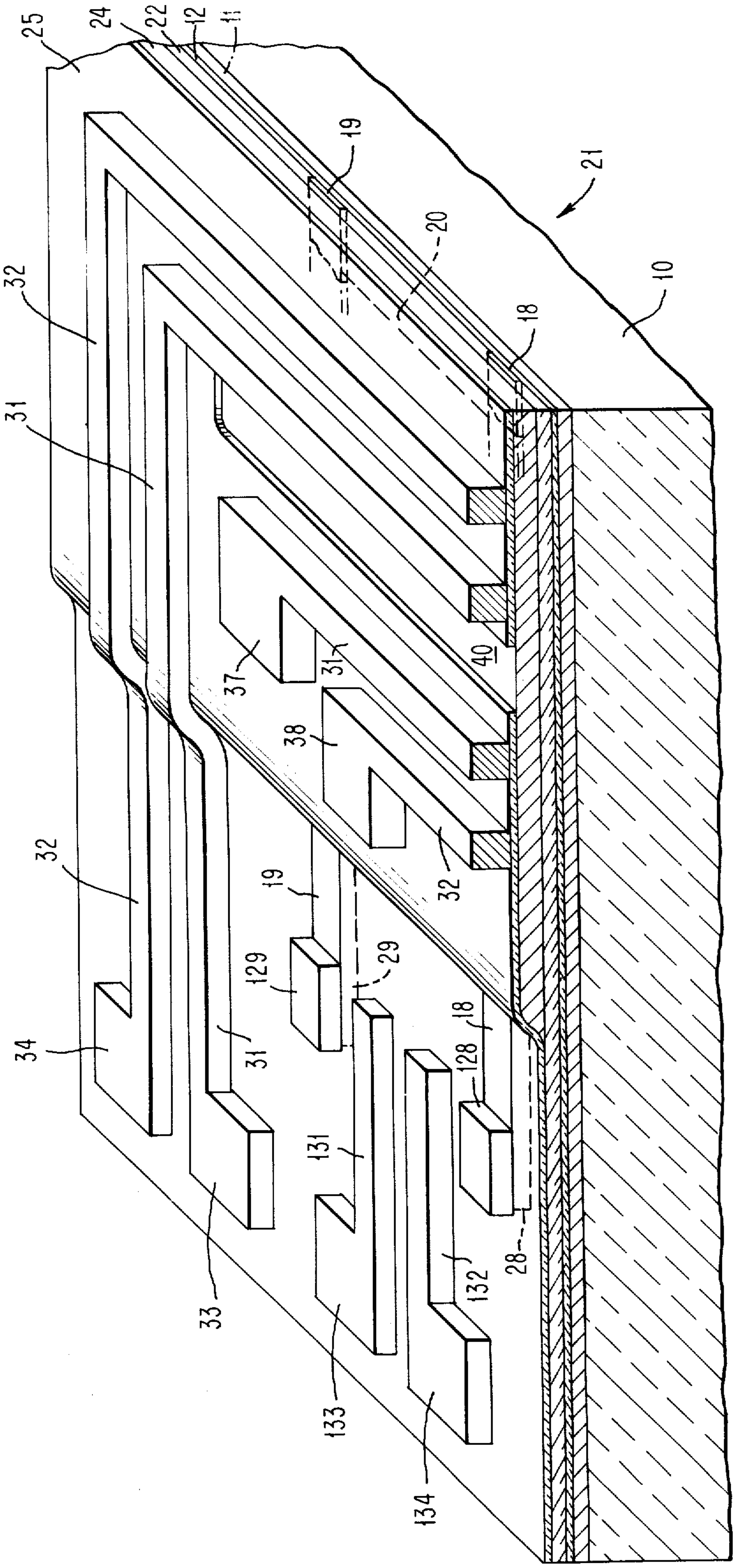
FIG. 6 is a perspective view of the device of FIG. 5 with a lateral section lengthwise of the device showing the addition of a layer of metallization.

In the next step, the metallization, shown in FIG. 6, for the multi-turn bifilar winding 31 and 32 is provided although for convenience of illustration, only a single turn of each coil is illustrated, by metallizing first with an adhesion layer of titanium and copper applied by evaporation to a thickness of 100–500A as described above followed by then applying resist and using a mask and depositing through this resist mask the copper or gold windings. Note the broad range of equivalents described above. The windings 31 and 32 and pads 128, 129, 37, 38, 33, 34, 133, 134 are then electroplated as gold or copper and are very thick, relatively speaking, on the order of 20,000A – 40,000A (2–4$\mu$ meters).

Figure 7:
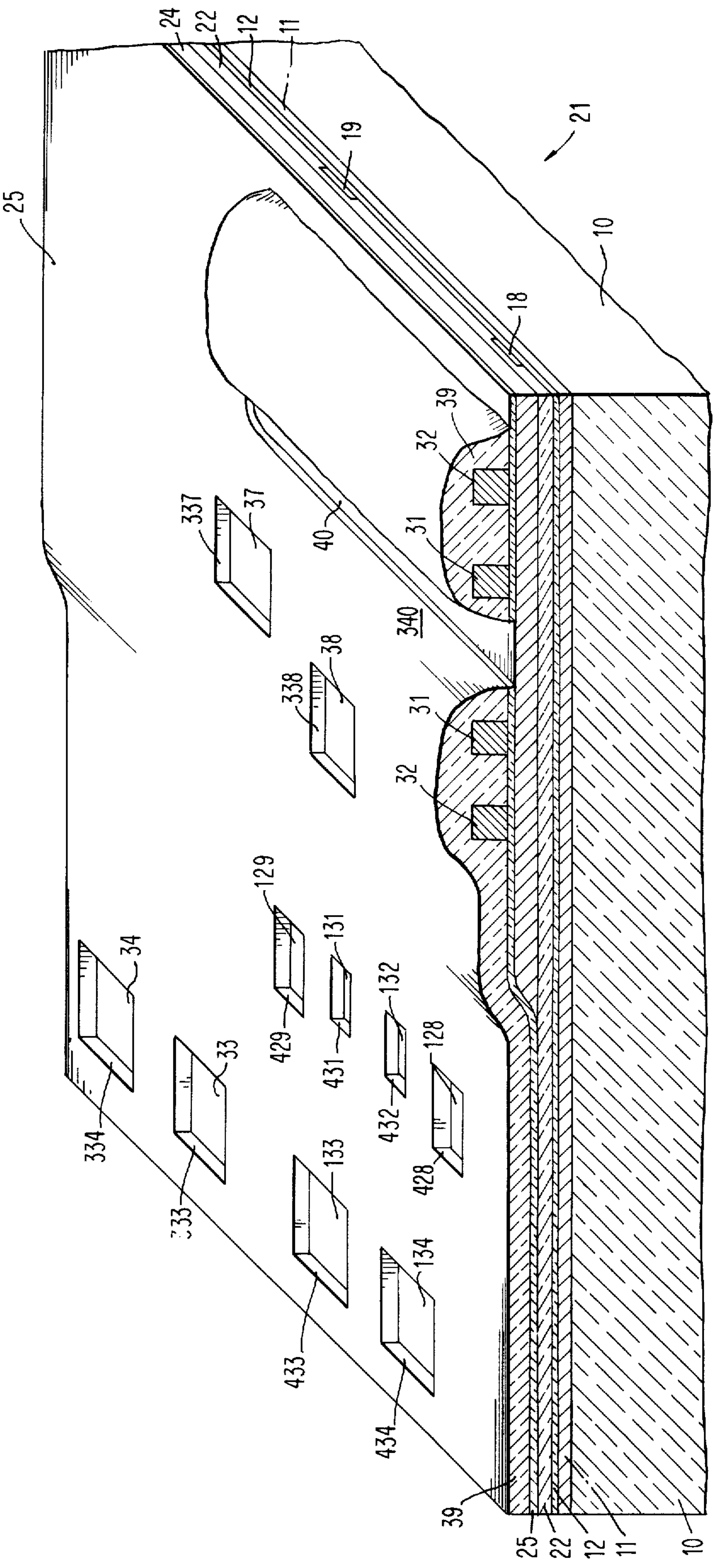
FIG. 7 is a similar view to FIG. 6 showing a layer of dielectric with windows cut for pads, connecting strips and the bridging together of shielding layers for the inductive write windings.

Next, in FIG. 7, Shipley resist layer 39 is applied to the entire area of the head and a mask is exposed to open up holes 333, 334, 337, 338, 428, 429, 431, 432, 433 and 434 for the pads 33, 34, 37, 38, 128, 219, 131, 132, 133 and 134, respectively as well as the return slot 340 above slot 40 for the upper recording head leg layer which surrounds the turns nearest to the tip end of the head which confronts the data recording media. Then etching is accomplished through to the pads and to the permalloy layer 24 below which is exposed along slot 40 as well as the pads. Then the polymer resist is baked out at about 225°C. It is a thermosetting ultraviolet sensitive plastic which is desensitized upon baking above about 135°C.

Figure 8:
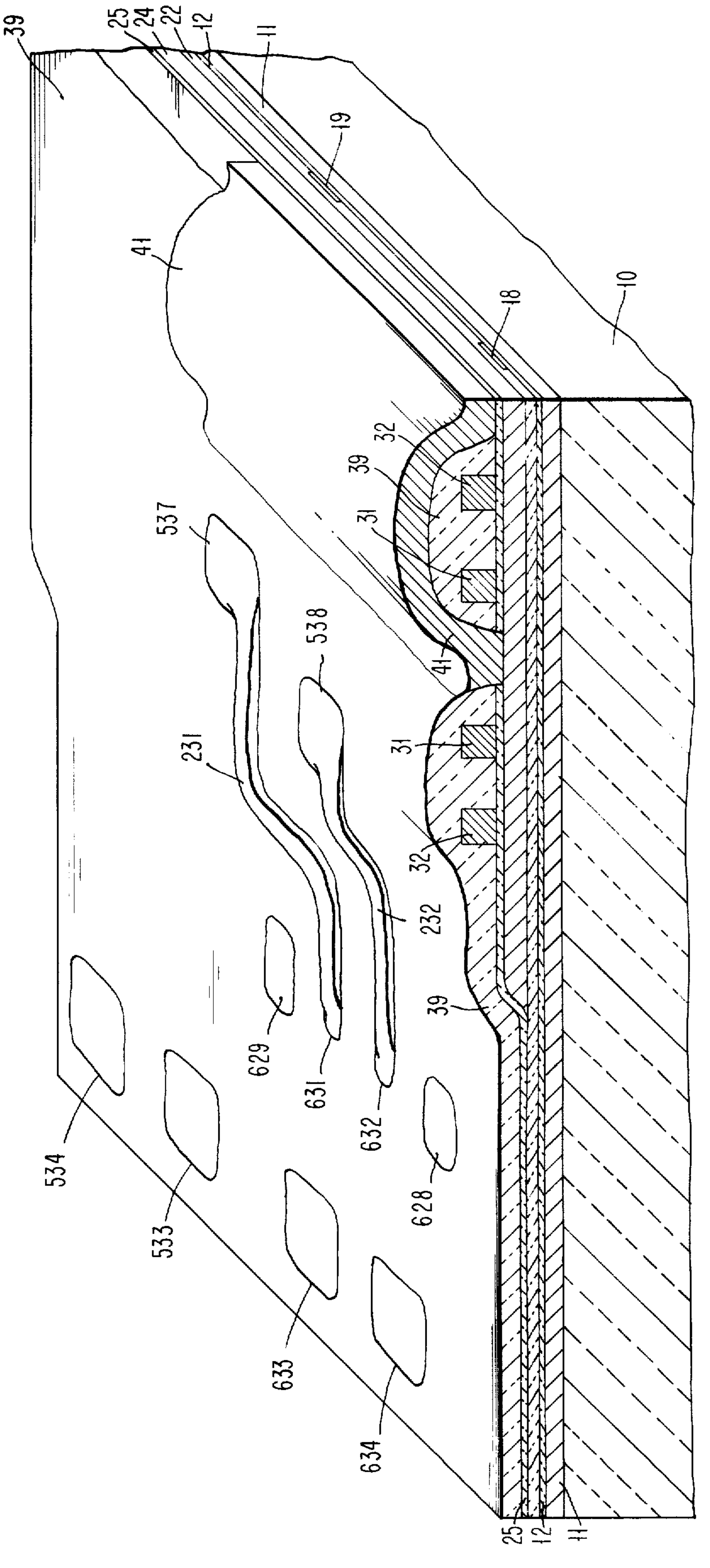
FIG. 8 shows the layer of permeable metallization providing the contact pads, connecting strips and the upper shielding layer.

Next, as shown in FIG. 8, there follows metallization with titanium and permalloy as described above in preparation for electroplating permalloy up to a thickness of 500 – 1,000A of permalloy all over the entire area of the head.

Figures 9, 9A:
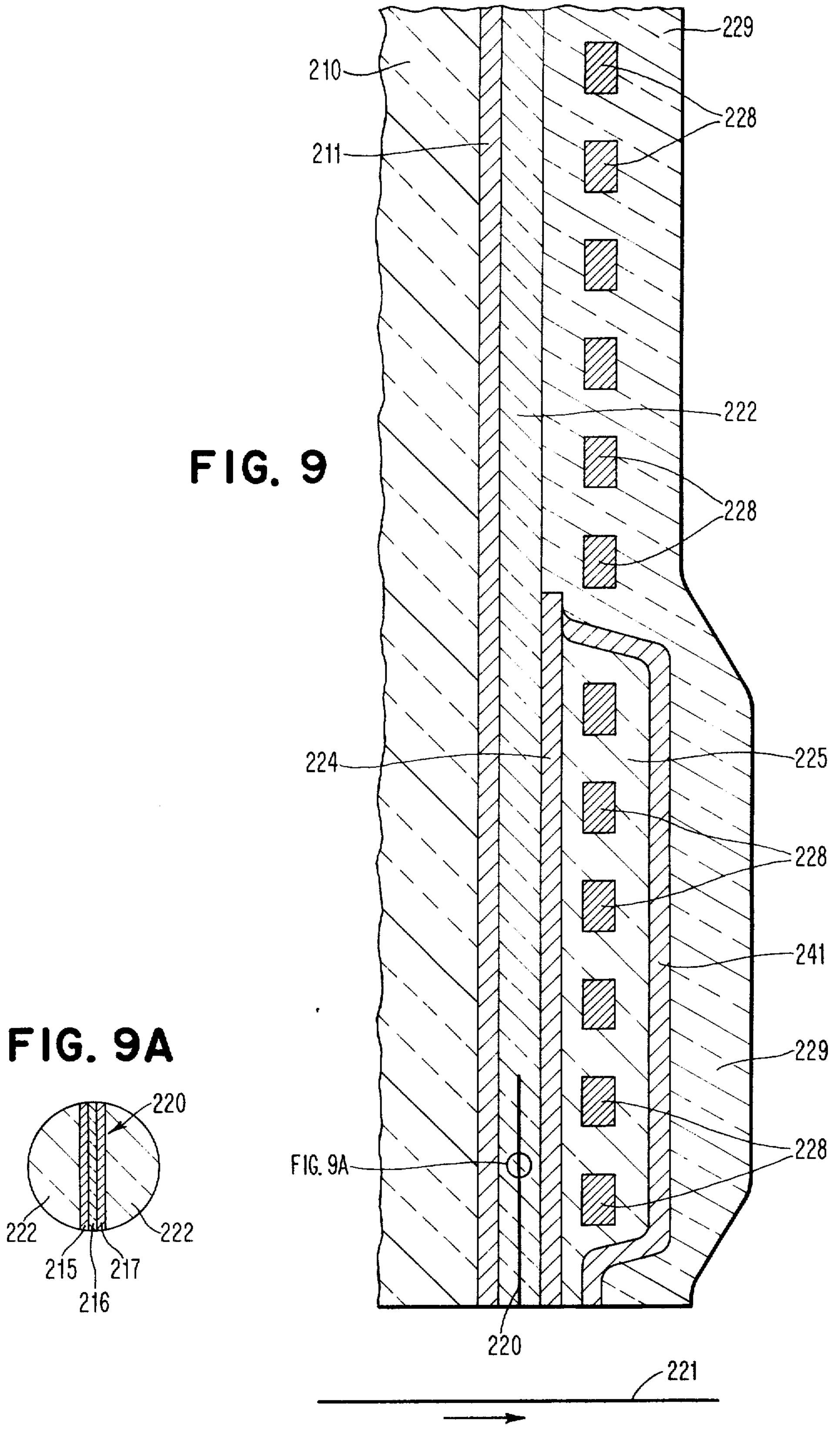
FIG. 9 is a lateral full sectional view of an idealized head similar to the other views with multiple spiral windings taken from top to bottom through the center of the MR stripe.
FIG. 9A shows an enlarged cross-sectional view of a segment of the MR stripe.

Then the permalloy is electroplated through frame masks formed upon the metallized base to a depth of 20,000 – 30,000A. Note that upper leg 41 extends down through slot 340 and slot 40 to reach the lower permalloy layer 24 beneath dielectric layers 25 and 39. In addition, all of the pads 33, 34, 37, 38, 128, 129, 133 and 134 are covered with permalloy pads 533, 534, 537, 538, 628, 629, 633 and 634, respectively, and the pads 37 and 38 covered by pads 537, 538 are connected to pads 631, 632 over lines 131 and 132 whose ends 133, 134 are capped with pads 633, 634 via bridging connections 231 and 232. The bridging lines 231, 232 show how to bring out connections from the center of bifilar planar coil to the outside pads in a multi-turn head such as shown in FIG. 9.

The next step is to provide a layer of a resist or other dielectric layer to protect the permalloy to be saved and to permit exposure through a mask of those areas where permalloy should be removed as shown in FIG. 8. The unwanted permalloy is etched in $FeCl_3$ solution or an equivalent etchant.

After etching, resist is removed and then the head is sputtered with a dielectric of glass, $SiO_2$, $Al_2O_3$, SiO, $Si_3N_4$ or other equivalent nonmagnetic, mechanically hard material.

Finally, the pads are all exposed by applying a resist, and exposing it through a mask of the pads and developing to etch the holes for bonding of leads to the connector pads, as well known in the art.

In FIG. 9 a very similar read-write head is shown with a ferrite shielding base 210, a prermalloy shielding layer layer dielectric 212, second shield 224 to shield the MR stripe 220 from data outside the field to be read, dielectric 225, windings 228, third shield 241 and dielectric 229.

It should be noted that the MR stripe 220 is adapted to read magnetic fields in medium 221 therebelow, but is very loosely coupled to any magnetic fields in the shielding layer 224 or the layer 211 which serve only to protect the MR stripe 220 from data outside of the area upon media 221 which is to be used. Thus, any fields picked up by shield 241 substantially will not couple to MR stripe 220.

FIG. 9A shows a fragmentary section of the MR stripe 220 composed of the sandwich of bias layer 215, separator layer 216, and magnetoresistive layer 217.

Figure 10:
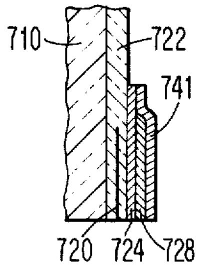
FIG. 10 shows a simple single turn inductive head in a sectional view of a head similar to that shown in FIG. 9.

In FIG. 10, a single turn writing head includes a substrate 710, gap 722 for the MR stripe 720, a shielding-leg layer 724 having a conductor 728 deposited directly thereon without dielectric which defines the gap of the read head. Again without intervening dielectric a second highly permeable leg layer 741 deposited on conductor 728 joins the first leg layer and together with it forms the writing head yoke which is the magnetic layer shield for the MR head and dual magnetic leg structure for the inductive read head. This is directed to very close flying height or in contact with the media (flexible medium) type operation.

What is claimed is:

1. A magnetic recording head for reading from and writing onto a magnetic recording medium comprising:

a first magnetic shield of permeable material having substantially planar surface and a first tip end, a first, thin film layer of dielectric material in secure contact with said planar surface of said shield, a thin film magnetoresistive stripe form of magnetic writing head structure in secure contact with said first layer of dielectric material aligned longitudinally adjacent to said tip end at the end of said head adapted to face said recording medium, a second thin film layer of dielectric material in secure contact with said first layer of dielectric and said magnetoresistive structure, thin film conductor means connected to terminals of said magnetoresistive stripe, a thin film shielding-leg layer of a magnetically permeable material providing a second shield and a first write leg in secure contact with said second layer of dielectric material extending alongside said magnetoresistive stripe substantially parallel to said planar surface of said first shield having a second tip end adjacent said first tip end to define a magnetic gap, a third thin film layer of dielectric material in secure contact with said second shield, at least one thin film electrical winding in secure contact with said third thin film layer passing near said second tip end, a fourth thin film dielectric layer in secure contact with said winding and said third dielectric layer having a slot therein extending through said winding centrally thereof and through said third dielectric layer to said shielding-leg layer, and a second leg layer having a third tip end aligned with said first and second tip ends and extending through said slot into magnetic contact with said shielding-leg layer whereby said winding extends between said shielding-leg layer and said second leg layer for providing magnetic writing fields across the gap between said tip ends of said shielding-leg layer and said second leg layer.

2. A head in accordance with claim 1 wherein said magnetoresistive stripe is composed of a sandwich of a hard bias material and a magnetoresistive sensor separated by a high resistivity layer.

3. A head in accordance with claim 1 wherein said first shield comprises a slab of ferrite with a layer of permalloy thereon.

4. A method of fabricating a magnetoresistive read, inductive write head comprising:

a. depositing a dielectric layer upon a shielding substrate, b. depositing magnetoresistive material upon said substrate, and forming a magnetoresistive stripe, c. depositing conductors through a mask to contact ends of said stripe, d. applying a second layer of dielectric, e. applying a central layer of permeable material to said second layer of dielectric, f. applying a third layer of dielectric to said central layer, g. applying windings to said third layer through using a mask, h. applying a fourth layer of dielectric, i. exposing openings to each of said conductors, terminals of said windings and to said central layer, and j. depositing a top layer of permeable material through said openings to provide pads and a top leg layer for said head by employing masking techniques.

5. A method in accordance with claim 4 wherein said conductors are applied by depositing an adhesion layer by evaporation of a highly oxidizable valve type metal prior to evaporating the conductor.

6. A method in accordance with claim 5 wherein said adhesion layer comprises titanium or chromium applied from 0° to 80° plus a material selected from the group including permalloy, copper and gold with a thickness from 500A to 1,000A.

7. A method in accordance with claim 5 wherein said adhesion layer includes a layer of a material selected from transition metals and metal alloys applied at a temperature greater than 100°C in the range of about 200°C.

8. A method in accordance with claim 4 wherein said windings are applied by depositing an adhesion layer by evaporation of an electrode material upon said substrate and subsequently electroplating said winding upon said adhesion layer through resist masks.

9. A method in accordance with claim 8 wherein said adhesion layer comprises titanium applied from 0° to 80° plus permalloy.

10. A method of fabricating a magnetoresistive read, inductive write head comprising:

a. depositing a dielectric layer upon a magnetically shielding substrate, b. depositing magnetoresistive material upon said substrate, c. depositing conductors through a first mask upon said magnetoresistive material, and removing said first mask, d. applying a second resist mask to said conductors and to said magnetoresistive layer,
e. removing the magnetoresistive material not protected by said second resist mask,
f. applying a second layer of dielectric,
g. applying a central layer of permeable material to said second layer of dielectric,
h. applying a third layer of dielectric to said central layer,
i. applying windings to said thrid layer through using a mask,
j. applying a fourth layer of dielectric,
k. exposing openings to each of said conductors and said windings and to said central layer, and
l. depositing a top layer of permeable material through said openings to provide pads and a top write head leg layer for the inductive writing segment of said head by employing masking techniques.

11. A method in accordance with claim 10 including depositing a passivating layer upon said top layer by sputtering 2 – 5$\mu$ meters of an inorganic mechanically hard, etchable, wear resistant, easily deposited dielectric.

12. A magnetic recording head for reading from and writing onto a magnetic recording medium comprising:
a first magnetic shield of permeable material having substantially planar surface and a first tip end,
a first, thin film layer of dielectric material in secure contact with said planar surface of said shield,
a thin film magnetoresistive stripe form of magnetic writing head structure in secure contact with said first layer of dielectric material aligned longitudinally adjacent to said tip end at the end of said head adapted to face said recording medium,
a second thin film layer of dielectric material in secure contact with said first layer of dielectric and said magnetoresistive structure,
thin film conductor means connected to terminals of said magnetoresistive stripe,
a thin film shielding-leg layer of a magnetically permeable material providing a second shield and a first write leg in secure contact with said second layer of dielectric material extending alongside said magnetoresistive stripe substantially parallel to said planar surface of said first shield having a second tip end adjacent said first tip end to define a magnetic gap,
at least one thin film electrical winding in secure contact with said shielding-leg layer near said second tip end,
a second leg of magnetically permeable material having a third tip end aligned with said first and second tip ends and extending into magnetic contact with said shielding-leg layer whereby said winding extends between said shielding-leg layer and said second leg for providing magnetic writing fields across the gap between said tip ends of said shielding-leg layer and said second leg.

13. A head in accordance with claim 12 wherein said magnetoresistive stripe is composed of a sandwich of a hard bias material and a magnetoresistive sensor separated by a high resistivity layer.

14. A method of fabricating a magnetoresistive read, inductive write head comprising:
a. depositing a dielectric layer upon a shielding substrate,
b. depositing magnetoresistive material upon said substrate, and forming a magnetoresistive stripe,
c. depositing conductors through a mask to contact ends of said stripe,
d. applying a second layer of dielectric,
e. applying a central layer of permeable material to said second layer of dielectric,
f. applying a winding to said central layer,
g. applying a top layer of permeable material to provide a top leg layer for said head.

15. A method in accordance with claim 14 wherein said conductors are applied by depositing an adhesion layer by evaporation of highly oxidizable valve type metal prior to evaporating the conductor.

16. A method in accordance with claim 15 wherein said adhesion layer comprises titanium or chromium applied from 0° to 80° plus a permalloy or Cu or Au from 800A to 1,000A thick.

17. A method in accordance with claim 15 wherein said adhesion layer includes a layer of a material selected from transistion metals and metal alloys applied at a temperature greater than 100°C in the range of about 200°C.

18. A method in accordance with claim 14 wherein said winding is applied by depositing an adhesion layer by evaporation of an electrode material upon said substrate and subsequently electroplating said winding upon said adhesion layer through resist masks.

19. A method in accordance with claim 18 wherein said adhesion layer comprises titanium applied from 0° to 80° plus permalloy.

20. A method of fabricating a magnetoresistive read, inductive write head comprising:
a. depositing a dielectric layer upon a magnetically shielding substrate,
b. depositing magnetoresistive material upon said substrate,
c. depositing conductors upon said magnetoresistive material,
d. applying a resist mask to said conductors and to said magnetoresistive layer,
e. removing the magnetoresistive material not protected by said resist mask,
f. applying a second layer of dielectric,
g. applying a central layer of permeable material to said second layer of dielectric,
h. applying a winding to said central layer,
i. depositing a top layer of permeable material to provide a top write head leg layer for the inductive writing segment of said head.

* * * * *